FIG. I

Nov. 23, 1965    J. H. POLHEMUS ETAL    3,219,186
WHIRLPOOL APPARATUS
Filed Oct. 30, 1962    2 Sheets-Sheet 2

INVENTORS
JAMES H. POLHEMUS
ROBERT AMMON
BY
*Robert Amer Norton*
ATTORNEY

3,219,186
WHIRLPOOL APPARATUS
James H. Polhemus, Mascot, Tenn., and Robert Ammon, Collinsville, Ill., assignors to Victor Rakowsky, Sante Fe, Calif.
Filed Oct. 30, 1962, Ser. No. 234,052
4 Claims. (Cl. 209—172.5)

This invention relates to an improved apparatus for the separation of particles of different specific gravity by means of a whirling, heavy density medium in which two vortices are used, rotating in the same direction but moving axially in opposite directions with a peripheral discharge of particles of higher specific gravity.

The separation by heavy density media of particles of different specific gravities, such as the beneficiation of ores, under which term is included coal, has proven to be an extremely efficient and cheap method wherever the nature of the materials permitted its use. The first development utilized the force of gravity in a static vessel such as a cone which was supplied with a heavy medium, usually a water suspension of extremely finely divided heavy particles such as magnetite or ferrosilicon. This is usually referred to in the art as the "heavy media process." Since just before the second World War to the present hundred of plants with enormous tonnages have been built using this method. In spite of the great practical success of the heavy media process certain limitations arose. The force causing heavy particles to sink in the medium of intermediate gravity and light particles to float was gravity and this created serious problems when finely divided ores or coal were to be beneficiated because the falling rate of fine heavy particles may approximate that of larger lighter particles and a mixture of specific gravity separation and classification resulted. As a consequence the heavy medi process has been only been useful with ores or other particle mixtures where very fine particles were not present. Unfortunately many ores have to be ground to a very small particle size in order to liberate values, and other mixtures such as refuse coal and the like may naturally occur or be produced in a size range including very small particles. As a result the heavy media process was not applicable to a number of ores and other mixtures.

The next development constituted the so-called hydrocyclone. In this type of apparatus the medium was pumped into a vessel, frequently conical in form, under fairly high pressures. Two vortices were produced within the cone, rotating in the same direction with one moving up and the other moving down. Feed was introduced, usually with the medium, at the base of the cone, light material was discharged from the center of the base of the cone by the rising inner vortex, and heavy material was driven out to the cone's periphery and forced down to an axial discharge at the apex. Hydrocyclones achieved practical success with certain ores where the nature of the mixture rendered heavy media separation unsuitable. The hydrocyclones, however, in turn encountered a limitation which restricted the field within which these vessels could be used. The restriction was determined by the inability of the vessel to separate very fine light material. This material entered with the medium at the periphery of the cone and had to be driven in to the rising inner vortex by the very small differential force between the light particles and the fine particles of the medium. As a result a considerable portion of the very fine light material did not reach the inner vortex, and so was not rejected in a vessel of reasonable length as there was insufficient time for the very small differential force to move these light particles into the center vortex, As a result, the hydrocyclone also was severely limited in the nature of the particle mixtures which it could handle.

The next development was the so-called "whirlpool," sometimes referred to as a "dynawhirlpool." In this type of vessel the feed of particle mixtures to be separated was directly into the inside of the inner vortex. Medium was pumped in tangentially to produce two vortices, and the discharge for heavy material was peripheral at the end of the vessel opposite to that where the medium was intorduced tangentially. The inner vortex moved to an axial discharge at the end of the vessel opposite to the feed entrance. Many whirlpool vessels are operated vertically, or inclined only a little to the vertical and so in the remainder of this specification which deals with an improved whirlpool, the terms top and bottom will be used for the end at which feed is introduced, and the end at which light material is discharged axially. It should be understood that whirlpools can be operated horizontally, or even in some cases with a reverse tip, so that it is not to be considered that the present invention is limited in any way to the use of a vertical vessel any more than that the ordinary whirlpools which were used before the present invention were so limited. However, it simplifies description and so will be used for this practical reason.

With whirlpools in which the medium is introduced at the bottom, as described in the Rakowsky Patent 2,725,983, December 6, 1955, a problem presented itself due to the fact that there was a tendency when the vessel was pushed to large output for the medium to back up in the feedpipe, or in other words, to flow out the top end of the vessel. In the vessel referred to in the patent this problem was solved by using a standpipe of sufficient height to prevent any medium overflow. This worked satisfactorily with vessels which are to be used vertically, or nearly vertically, but it constituted even there a somewhat awkward mechanical construction.

The next step in the perfection of the whirlpool art is described in the patent to Rakowsky 2,917,173 December 15, 1959. In this patent there is no standpipe but there is a vertical baffle surrounding the feedpipe where it extends into the vessel, and extending down below the level of the peripheral heavy or sink discharge. This modification solved completely the problem of medium flowing out of the top of the vessel, and did it without the awkward standpipe which was hitherto required. This, therefore, made the improved whirlpool useful in practically any position, down to horizontal or even tipped below, which was not practical with a standpipe since, of course, the standpipe lost its effectiveness if the vessel were too near horizontal. Wherever the nature of the ore to be beneficiated permits, whirlpools with the vertical baffle improvement made a very satisfactory device. However, here again there proved to be certain limitations on the equipment and ore to be handled which reduced its universal applicability. If a wide range of ore is to be handled, for example coal which may have coarse particles or lumps three or more inches in diameter down to extremely fine coal, it was necessary to have a large feedpipe to permit handling the larger particles. For example feedpipes of the order of five to six inches in diameter or even larger were necessary. When such a feedpipe was surrounded by a vertical baffle the space between the baffle and the vessel wall became constricted and the dead space between the baffle and the feedpipe sometimes became plugged with a stagnant mixture of ore and medium.

The present invention deals with an improved whirlpool of the general class described in the Rakowsky Patent 2,725,983 in which medium is introduced at the bottom. It solves all of the problems solved by the vertical baffle of Patent 2,917,173 but without any of the problems presented where space between baffle and vessel wall became too close. In other words, the present invention solves the problem presented in the original Rakowsky patent and solves it for a wider range of ore sizes than is convenient with the vertical baffle. At the same time the solution is extremely simple and results in vessels which are cheaper to construct than those with the vertical baffle surrounding the feedpipe.

Essentially the present invention utilizes a horizontal baffle at the end of the feedpipe. We are again using the term horizontal as if the vessel were perfectly vertical. Actually, of course, this baffle is substantially at right angles to the axis of the vessel and is not necessarily horizontal if the vessel is not vertical. This baffle is best formed by utilizing a feedpipe of increased wall thickness. However, of course, it is not necessary that it be backed by solid metal. It can be hollow because the medium and ore vortices striking the bottom face of the baffle are not concerned with what is back of this face. While the dimensions of the vertical baffle in the earlier solution can be varied through quite wide ranges, the dimensions of the horizontal baffle are quite critical. There is a very definite range below and above which optimum results are not obtained. The range, while critical, is not so narrow as to present any problem in practical construction of vessels. In general the baffle should be at least about ½", and not greater than 3". Optimum results are obtained in the vicinity of 2". This will be brought out in greater quantitative detail in the tests which will be described after describing the vessel in connection with the drawings in which:

Figure 1:
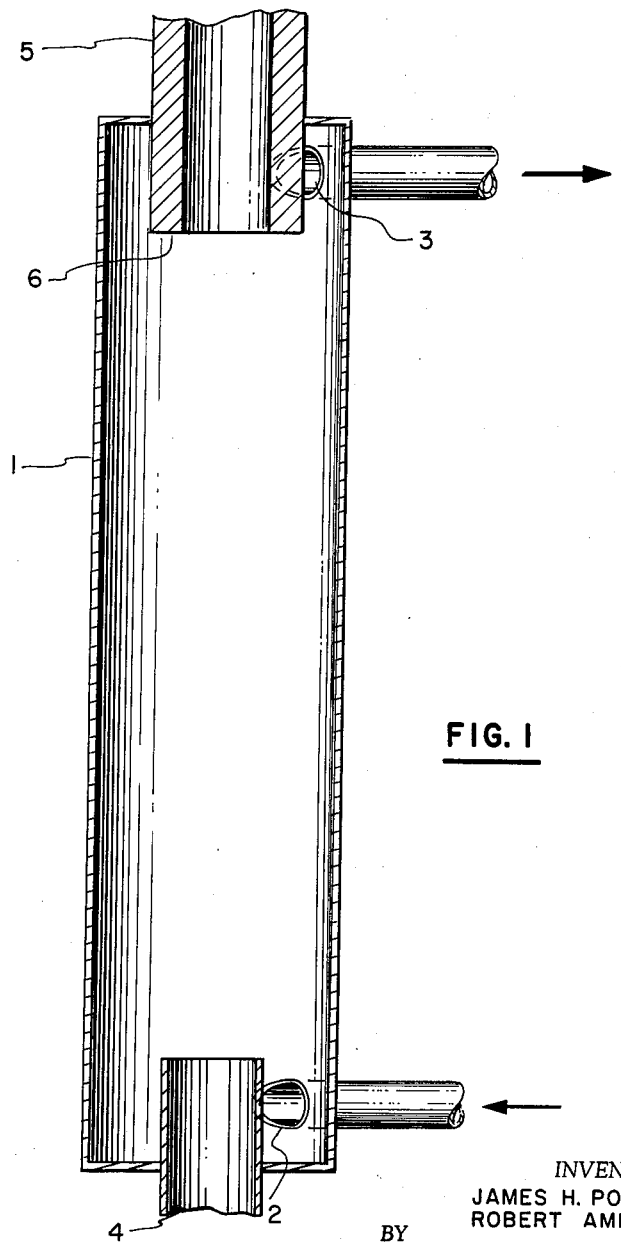
FIG. 1 is a vertical section through a 15" commercial size vessel.

In FIG. 1 the whirlpool is shown with outer wall 1. It should be noted that the 15" I.D. dimensions referred to above constitute a commercial sized vessel, and not a laboratory instrument. Medium is introduced tangentially at 2 by a conventional pump (not shown). Two vortices are formed whirling in the same direction, but one moving axially up and one moving axially down. The rising vortex along the edge of the vessel wall discharges peripherally with the sink particles at 3, and the inner vortex, which normally has a hollow air core, is discharged axially through the opening 4. Feed is introduced through the feedpipe 5 which in the illustrated vessel has an internal diameter of 5½". For best results the feedpipe should not be larger than the opening 4 and preferably is somewhat smaller. Varying external diameters of the feedpipe in the vessel provide different sizes of a horizontal baffle 6 which is formed by the lower edge of the thick feedpipe. This baffle is very simply formed of solid metal but of course may be hollow or any other construction as the whirling medium striking its bottom face is not concerned with the constructional material back of the face.

The vessel shown in FIG. 1 is vertical. This is not at all necessary as the whirlpool may be operated tilted, even down to the horizontal or beyond. In fact, for certain operations a tilt nearer the horizontal gives slightly better results, as will be illustrated below. However, for illustrative and descriptive purposes a vertical vessel simplifies the present specification. Also, it should be understood that there is described a commercial sized vessel of definite horizontal dimensions. These dimensions may be varied as it is the dimensions of the horizontal baffle which are of primary importance in the present invention. The present invention is concerned with an improved, practical, operating whirlpool, and not in any sense with a laboratory instrument. If a very small laboratory whirlpool is designed the effects obtained by the horizontal baffle dimensions cannot necessarily be translated into a tiny instrument. Therefore, the present specification and the claims should be considered as directed to commercial sized vessels, and not to tiny laboratory vessels.

The invention will be illustrated by some tests with typical ores. The first test was made with varying baffle sizes, using as feed anthracite coal having a range from 9/16" down to very fine sizes. The feed rate was of the order of 15 tons an hour, which is a fair throughput for a vessel of this dimension. In comparative tests with whirlpools it is necessary to maintain one condition constant as the medium gravity, in this case finely divided magnetite in water, will vary from the float discharge to the sink discharge by reason of the fact that the centrifugal force in the whirling vortices also acts on the medium particles to produce a greater concentration in the outer vortex going to the sink discharge. It is common in making comparative tests with whirlpools to maintain the gravity of the float discharge at 4 constant. This was done in the present test and a gravity of 1.46 was chosen, as this represented the best gravity for the particular coal treated. It was, of course, necessary to vary the gravity of the medium introduced in order to maintain this particular float gravity with different horizontal baffle sizes. The sink gravity, of course, also changed, and since the most important single practical characteristic is the ash content of the coal, it will be found that the best coal quality corresponded to the lowest sink gravity. An analysis of the coal showed that if there was a theoretically perfect recovery it would be approximately 64%. The following table shows the results with varying horizontal baffle sizes.

*Table 1*

| Feed Pipe, inches | | | Feed | Sink | Ash Percent Coal | 1.70 Sink in Float | 1.70 Float in Sink | Percent Feed as Float |
| --- | --- | --- | --- | --- | --- | --- | --- | --- |
| O.D. | I.D. | Thick | | | | | | |
| 5 9/16 | 5½ | 1/16 | 1.97 | 2.17 | 8.2 | 5.8 | .60 | 56.5 |
| 5¾ | 5½ | 1/8 | 1.965 | 2.165 | 7.6 | 6.4 | .55 | 67.1 |
| 6 | 5½ | ¼ | 1.97 | 2.175 | 7.9 | 6.6 | .45 | 66.0 |
| 6½ | 5½ | ½ | 1.97 | 2.17 | 8.1 | 5.6 | .50 | 68.5 |
| 7 | 5½ | ¾ | 1.915 | 2.115 | 7.4 | 3.9 | .60 | 63.1 |
| 7½ | 5½ | 1 | 1.905 | 2.105 | 7.7 | 3.4 | .40 | 62.7 |
| 9½ | 5½ | 2 | 1.86 | 2.055 | 6.9 | 1.1 | .20 | 60.7 |
| 11½ | 5½ | 3 | 1.95 | 2.145 | 8.0 | 7.8 | .50 | 62.0 |
| 13½ | 5½ | 4 | 1.955 | 2.17 | 8.3 | 7.7 | .60 | 64.0 |

Figure 2:
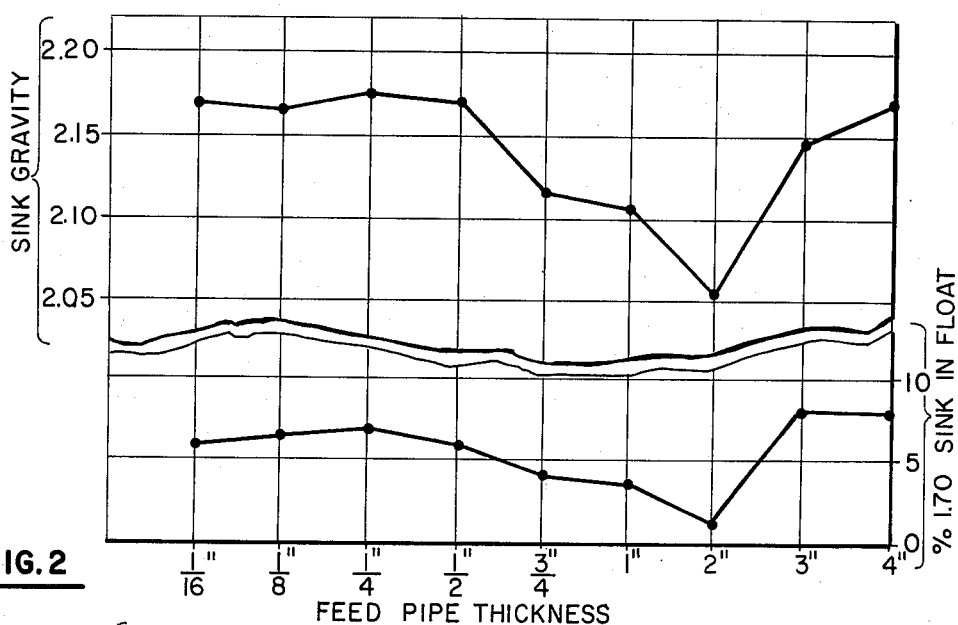
FIG. 2 is a set of curves of results with varying horizontal baffle dimensions when treating coal.

FIG. 2 shows in graphical form the most important results of the present tests, namely the quality of the coal obtained. Improved results begin at about ½", reach an optimum at approximately 2", and rapidly deteriorate as 3" is approached. The second curve shows that the quality of coal is paralleled by sink gravity and shows the same general shape, with a minimum at the same point. It is apparent that the primary result of the change in dimensions of the horizontal baffle is to change the sink gravity, but this gives quite dramatic results in the quality of the coal. In this connection it should be noted that the optimum results at 2″ are only about 1% of sink in the float, whereas the ash content shows under 7%. The reason for this is that there is inherent ash in the coal which cannot be separated by any physical process. All that any gravity separation can do is to eliminate the ash which is present as separate particles, and as shown, this is the heavy material appearing in the float discharge. It should be noted that we are dealing here with an improvement on a vessel which is already capable of giving good commercial results without the present improvement. The 5 to 6% of sink which is encountered with baffles from ¼″ to ½″ constitutes a commercially acceptable beneficiation. It has thus been made possible by the present invention to exceed substantially results which were considered formerly to be entirely acceptable.

Figure 3:
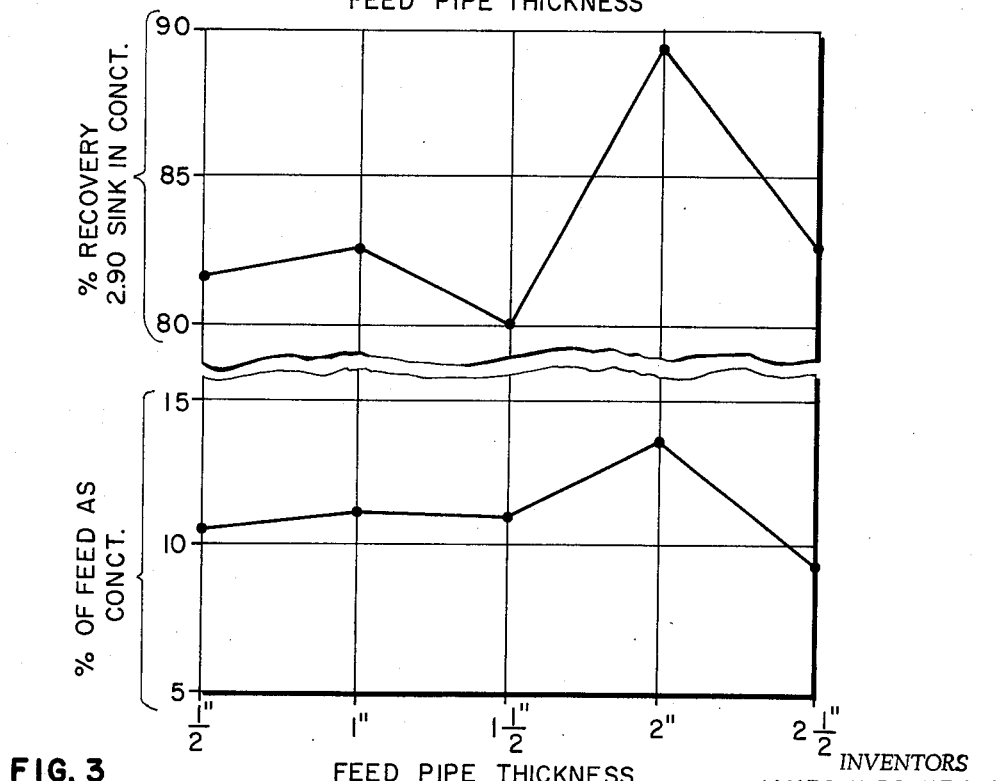
FIG. 3 is a similar set of curves for a zinc ore.

Table 2 which follows shows the results obtained with a zinc ore, the particular ore used being primary drag sands of a size range from about ¼″ to 60 mesh obtained from the mine of American Zinc Lead and Smelting Company at Mascot, Tennessee. The throughput, as in the tests with coal, was approximately 15 tons per hour. FIG. 3 shows in graphical form the important results of the table.

It will be noted that, as in the first table, the float gravity was maintained constant. This gravity was between 2.605 and 2.61. Of course this gravity is much higher than with coal because of the nature of the ore treated. It should be noted that in the case of zinc ore the most important characteristic is the recovery of the zinc, whereas in coal it was the lowering of the ash content. In spite of the difference in the nature of the desired result the shape of the curves of FIG. 3 and FIG. 2 are very similar, though of course inverted because in the case of FIG. 2 the optimum results were expressed as a minimum, and in FIG. 3 as a maximum. As is customary with ores of higher gravities, the medium was a mixture of ferrosilicon and magnetite, approximately 57° ferrosilicon, —200 mesh, and 43% magnetite, grade B.

As shown in the drawings, the horizontal baffle is flat. This is, of course, the simplest mechanical form of the baffle. However, its function does not appear to depend significantly on its shape. For example, a grooved baffle gives almost exactly the same results as a flat baffle of the same dimensions. Therefore, when referring to a baffle in the claims it is not intended to restrict the invention to a baffle which is perfectly flat.

Table 2

| Feed Pipe, inches | | | Medium Gravity | | | Percent of Feed as Conc. | Percent Recovery 2.90 Sink in Conc. |
|---|---|---|---|---|---|---|---|
| O.D. | I.D. | Thick | Feed | Sink | Float | | |
| 6½ | 5½ | ½ | 2.94 | 3.12 | 2.60½ | 10.1 | 81.8 |
| 7½ | 5½ | 1 | 2.94 | 3.11 | 2.61 | 10.2 | 82.6 |
| 8½ | 5½ | 1½ | 2.91½ | 3.07 | 2.61 | 10.5 | 80.0 |
| 9½ | 5½ | 2 | 2.89 | 3.05 | 2.60½ | 14.1 | 89.1 |
| 10½ | 5½ | 2½ | 2.92½ | 3.08 | 2.61 | 7.9 | 82.9 |

We claim:
1. In a separatory vessel for separating particulate mixtures having particles of varying specific gravity having means for introducing tangentially a liquid separating medium near one end of the vessel, axial discharge means for light material at the same end of the vessel, peripheral discharge means for heavy particles at the opposite end of the vessel and a feedpipe for introduction of feed axially in the same end of the vessel as the peripheral discharge; the improvement which comprises an extension of the feedpipe into the vessel and a baffle at the end of said pipe having a continuous solid surface which is substantially at right angles thereto, said baffle extending radially outward from the inner surface of the feedpipe and having a width not substantially less than ½″, and not in excess of 3″.

2. A vessel according to claim 1 in which the baffle width approximates 2″.

3. A vessel according to claim 1 in which the feedpipe has a wall thickness corresponding to the baffle dimension, the lower end of which forms the baffle.

4. A vessel according to claim 2 in which the feedpipe has a wall thickness corresponding to the baffle dimension, the lower end of which forms the baffle.

References Cited by the Examiner
UNITED STATES PATENTS

| 2,725,983 | 12/1955 | Rakowsky | 209—211 |
| 2,757,582 | 8/1956 | Freeman et al. | 209—211 |
| 2,917,173 | 12/1959 | Rakowsky | 209—211 X |
| 2,927,693 | 3/1960 | Freeman et al. | 209—211 |
| 2,975,896 | 3/1961 | Hirsch | 209—211 |
| 3,101,313 | 8/1963 | Woodruff | 209—211 |

FOREIGN PATENTS 825,332  12/1951  Germany.

ROBERT F. BURNETT, *Primary Examiner.*

HARRY B. THORNTON, *Examiner.*